(12) United States Patent  
Offord et al.

(10) Patent No.: US 9,289,938 B2  
(45) Date of Patent: Mar. 22, 2016

(54) CONTAINER HAVING OXYGEN SCAVENGING SYSTEM

(71) Applicant: Amcor Limited, Hawthorn, Victoria (AU)

(72) Inventors: David Offord, Hayward, CA (US); Kimberly S. Houchens, Perrysburg, OH (US); Frederick C. Beuerle, Jackson, MI (US); Luke A. Mast, Brooklyn, MI (US); Reinhard C. J. Luchies, Ann Arbor, MI (US); Terry D. Patcheak, Ypsilanti, MI (US)

(73) Assignee: Amcor Limited, Hawthorn (AU)

( * ) Notice: Subject to any disclaimer, the term of this patent is extended or adjusted under 35 U.S.C. 154(b) by 114 days.

(21) Appl. No.: 13/951,721

(22) Filed: Jul. 26, 2013

(65) Prior Publication Data

US 2013/0307199 A1 Nov. 21, 2013

Related U.S. Application Data

(62) Division of application No. 13/043,824, filed on Mar. 9, 2011, now Pat. No. 8,496,885.

(60) Provisional application No. 61/313,158, filed on Mar. 12, 2010.

(51) Int. Cl.
*B29C 49/00* (2006.01)
*B29C 49/04* (2006.01)
*C01B 3/06* (2006.01)
(Continued)

(52) U.S. Cl.
CPC ............. *B29C 49/0005* (2013.01); *B29C 49/04* (2013.01); *B29C 49/221* (2013.01); *B65D 1/0215* (2013.01); *B65D 1/40* (2013.01); *B65D 81/266* (2013.01); *C01B 3/065* (2013.01); *C01B 5/00* (2013.01); *B29K 2067/00* (2013.01); *B29K 2995/0067* (2013.01); *B29K 2995/0069* (2013.01); *B29L 2031/7158* (2013.01);
(Continued)

(58) Field of Classification Search
None
See application file for complete search history.

(56) References Cited

U.S. PATENT DOCUMENTS 3,419,400 A 12/1968 Hayhurst et al.
3,811,999 A 5/1974 Fleischer et al.
(Continued)

FOREIGN PATENT DOCUMENTS

EP 0758611 2/1997
EP 2404753 1/2012
(Continued)

OTHER PUBLICATIONS

International Search Report and Written Opinion dated Nov. 28, 2011 from corresponding International Patent Application No. PCT/US2011/027836 (eight pages).
(Continued)

*Primary Examiner* — Monica Huson
(74) *Attorney, Agent, or Firm* — Harness, Dickey & Pierce, PLC

(57) ABSTRACT

A polyethylene terephthalate container having a hydrogen generator and catalyst disposed or otherwise incorporated in components of the container, including the closure, closure insert, label, label glue, and/or any other portions of the final container assembly. In addition, the catalyst and the hydrogen generator can both be located in the same component. Methods for dispersing the hydrogen generator and catalyst in the container wall without affecting clarity are provided.

16 Claims, 2 Drawing Sheets

(51) Int. Cl.

| | | |
|---|---|---|
| *C01B 5/00* | (2006.01) | |
| *B29C 49/22* | (2006.01) | |
| *B65D 1/40* | (2006.01) | |
| *B65D 1/02* | (2006.01) | |
| *B65D 81/26* | (2006.01) | |
| *B29K 67/00* | (2006.01) | |
| *B29L 31/00* | (2006.01) | |

(52) U.S. Cl.
CPC ............ *Y02E60/362* (2013.01); *Y10T 428/139* (2015.01); *Y10T 428/1393* (2015.01)

(56) References Cited

U.S. PATENT DOCUMENTS

| | | | |
|---|---|---|---|
| 4,013,422 | A | 3/1977 | Spinner et al. |
| 4,279,350 | A | 7/1981 | King |
| 4,421,235 | A | 12/1983 | Moriya |
| 4,516,679 | A | 5/1985 | Simpson et al. |
| 4,526,752 | A | 7/1985 | Perlman et al. |
| 5,045,283 | A | 9/1991 | Patel |
| 5,114,507 | A | 5/1992 | Piltz et al. |
| 5,316,949 | A | 5/1994 | Bull et al. |
| 5,358,876 | A | 10/1994 | Inoue et al. |
| 5,735,984 | A | 4/1998 | Hoff et al. |
| 5,804,236 | A | 9/1998 | Frisk |
| 5,934,494 | A | 8/1999 | Takahashi et al. |
| 6,139,935 | A | 10/2000 | Cullen et al. |
| 6,254,969 | B1 | 7/2001 | Eberle |
| 6,454,965 | B1 | 9/2002 | Ching et al. |
| 6,689,438 | B2 | 2/2004 | Kennedy et al. |
| 6,986,807 | B2 | 1/2006 | Brunk |
| 7,021,478 | B1 | 4/2006 | Hock |
| 7,159,374 | B2 | 1/2007 | Abercrombie, III et al. |
| 7,368,153 | B2 | 5/2008 | Barmore et al. |
| 7,862,770 | B2 | 1/2011 | Shahriari |
| 2004/0050740 | A1 | 3/2004 | Lewis |
| 2004/0071885 | A1 | 4/2004 | Hutchinson et al. |
| 2005/0087452 | A1 | 4/2005 | McAnalley et al. |
| 2009/0074611 | A1 | 3/2009 | Monzyk et al. |
| 2009/0220717 | A1 | 9/2009 | Wilczak et al. |
| 2010/0028499 | A1* | 2/2010 | Rule et al. .................... 426/106 |
| 2012/0114529 | A1 | 5/2012 | Carmichael et al. |
| 2012/0118764 | A1 | 5/2012 | Valus et al. |

FOREIGN PATENT DOCUMENTS

| | | |
|---|---|---|
| WO | WO 96/34070 | 10/1996 |
| WO | WO 99/28411 | 6/1999 |
| WO | WO 00/35304 | 6/2000 |
| WO | WO 00/54866 | 9/2000 |
| WO | WO 02/099416 | 12/2002 |
| WO | WO 2006/112958 | 10/2006 |
| WO | WO 2008/090354 | 7/2008 |
| WO | WO 2010/115992 | 10/2010 |
| WO | WO 2010/116192 | 10/2010 |
| WO | WO 2011/157695 | 12/2011 |

OTHER PUBLICATIONS

Supplementary European Search Report mailed Oct. 24, 2014 in corresponding European patent application Serial No. 11753991.6 (five pages).

* cited by examiner

CONTAINER HAVING OXYGEN SCAVENGING SYSTEM

CROSS-REFERENCE TO RELATED APPLICATIONS

This application is a divisional of U.S. patent application Ser. No. 13/043,824 filed Mar. 9, 2011, which claims the benefit of U.S. Provisional Application No. 61/313,158 filed on Mar. 12, 2010. The entire disclosures of the above applications are incorporated herein by reference.

FIELD

This disclosure generally relates to containers for retaining a commodity, such as a solid or liquid commodity. More specifically, this disclosure relates to a polyethylene terephthalate (PET) container having an oxygen scavenging system employing a hydrogen generator and a catalyst for minimizing the effect of oxygen penetration into the fill.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Unfortunately, PET is a poor barrier to oxygen. One of the main factors that limit the shelf life of foods and beverages (herein known as "fills") in PET containers is the ingress of oxygen through the walls of the container followed by oxidation of the fill. Many strategies have been employed to reduce the amount of oxygen in contact with food in PET containers. Some strategies include headspace replacement, which replaces oxygen in the headspace during packaging with an inert gas, such as $N_2$ or $CO_2$. Alternative strategies include using package barrier coatings, such as chemical vapor deposited (CVD) aluminum oxide or silicon oxide. Still further, some strategies include the use of embedded barrier layers, such as multilayer packages, or PET barrier additives that create physical barriers to oxygen diffusion through the packaging (e.g., nylon, nanoclays). Finally, some strategies have used oxygen scavengers that react with oxygen in a predetermined way (e.g., oxidizable plastics, hydrogen gas, reactive metals and organic molecules) to minimize its effect, which usually requires the use of a catalyst.

An example of oxygen reducing technology is available from ColorMatrix (herein known as "Hy-Guard Technology"; International Publication Number WO 2008/090354 A1, which is hereby incorporated by reference). The technology involves the slow release of hydrogen from the container using a hydrogen generator such as sodium borohydride that releases hydrogen on exposure to water according to the following reaction:

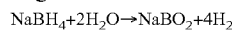

The hydrogen subsequently reacts with oxygen in the presence of a metal catalyst (e.g., palladium) to create water. The hydrogen that does not react with oxygen will slowly permeate out of the container.

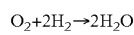

Pd

The ColorMatrix system sets forth various locations of the hydrogen generator and catalyst as follows:

| HYDROGEN GENERATOR LOCATIONS | CATALYST LOCATIONS |
|---|---|
| Container wall (Claims 10, 18) | Container wall (Claims 4, 10, 38) |
| One layer of a multilayer container wall (Claim 32) | One layer of a multilayer container wall (Claim 32) |
| Container closure (Claims 34, 37) | |

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present teachings, a plastic container, in particular a PET container is provided having a hydrogen generator and catalyst disposed or otherwise incorporated in components of the container, including the closure, closure insert, label, label glue, and/or any other portions of the final container assembly. In addition, the catalyst and the hydrogen generator can both be located in the same component.

Furthermore, according to the principles of the present teachings, methods are disclosed for dispersing the hydrogen generator and catalyst in the container wall without affecting clarity.

Still further, according to the principles of the present teachings, additional container configurations incorporating the present principles are disclosed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
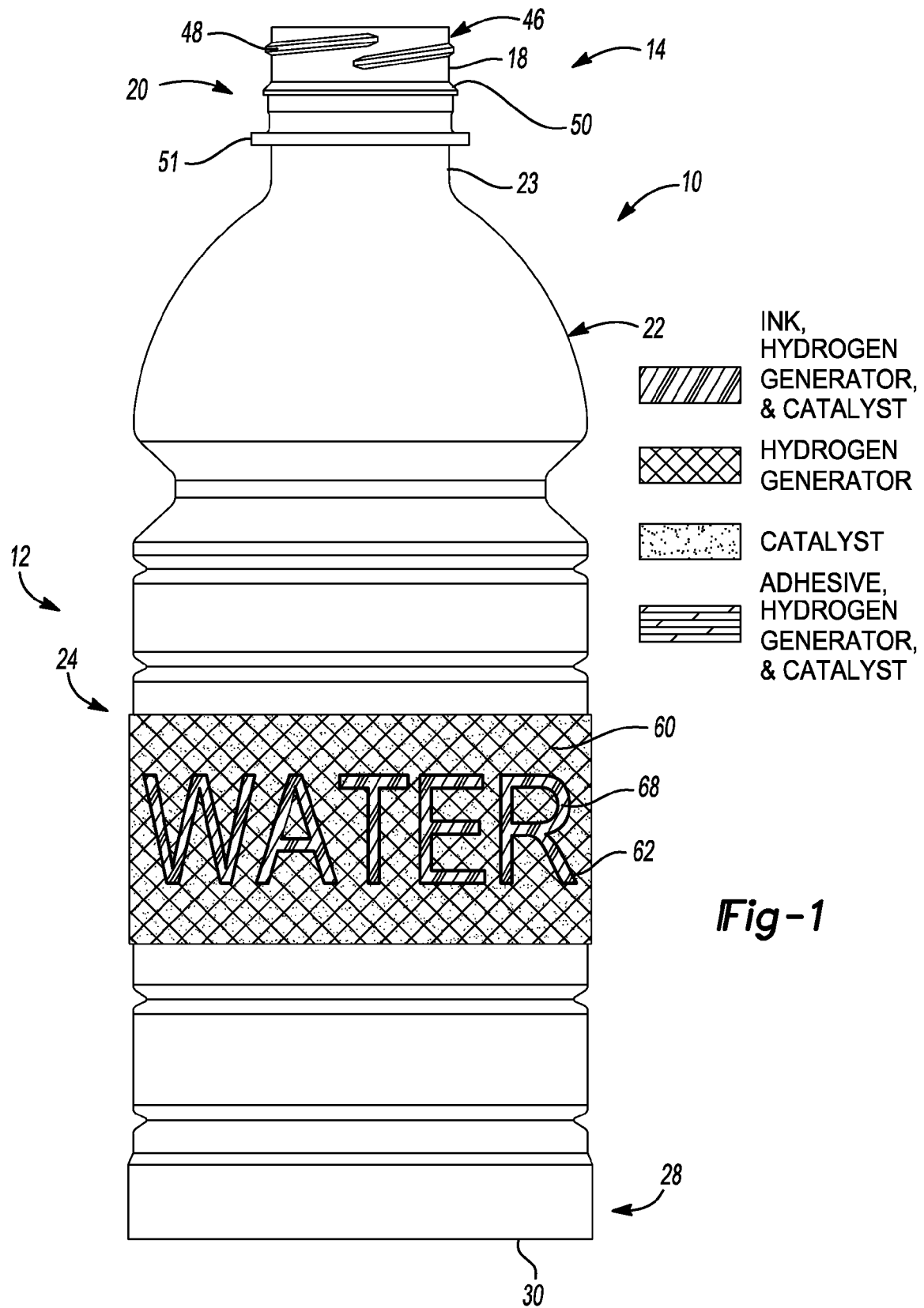
FIG. 1 is a side view of an exemplary container incorporating the features of the present teachings.

Example embodiments will now be described more fully with reference to the accompanying drawing. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container being made of PET and incorporating a hydrogen generator and catalyst component. The container of the present teachings controls and/or reduces the effect of oxygen penetrating the container material and entering the commodity or fill contained therein.

It should be appreciated that the size and specific configuration of the container may not be particularly limiting and, thus, the principles of the present teachings can be applicable to a wide variety of plastic container shapes. Therefore, it should be recognized that variations can exist in the present embodiments. That is, it should be appreciated that the teachings of the present disclosure can be used in a wide variety of containers, including reusable/disposable packages including resealable plastic bags (e.g., ZipLock® bags), resealable containers (e.g., TupperWare® containers), dried food containers (e.g., dried milk), drug containers, and oxygen-sensitive chemical packaging.

Accordingly, the present teachings provide a plastic, e.g. polyethylene terephthalate (PET), container generally indicated at 10. The exemplary container 10 can be substantially elongated when viewed from a side. Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

As shown in FIG. 1, the exemplary plastic container 10 according to the present teachings defines a body 12, and includes an upper portion 14 having a cylindrical sidewall 18 forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when exemplary container 10 is uprightly-placed on a surface.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening for filling and dispensing of a commodity stored therein. Although the container is shown as a drinking container, it should be appreciated that containers having different shapes, such as sidewalls and openings, can be made according to the principles of the present teachings.

The finish 20 of the exemplary plastic container 10 may include a threaded region 46 having threads 48, a lower sealing ridge 50, and a support ring 51. The threaded region provides a means for attachment of a similarly threaded closure or cap (not illustrated). Alternatives may include other suitable devices that engage the finish 20 of the exemplary plastic container 10, such as a press-fit or snap-fit cap for example. Accordingly, the closure or cap (not illustrated) engages the finish 20 to preferably provide a hermetical seal of the exemplary plastic container 10. The closure or cap (not illustrated) is preferably of a plastic or metal material conventional to the closure industry and suitable for subsequent thermal processing.

According to the principles of the present teachings, the hydrogen generator and the catalyst may be placed in or on any one of a number of locations of the exemplary container 10. As will be discussed in greater detail herein, many of these locations have a major advantage over the prior art of "hiding" the hydrogen generator and catalyst so that they are not apparent to the consumer. Other advantages, such as ease of manufacturing, dose control, and the like are anticipated.

Accordingly, the present teachings provide exemplary container 10 having a hydrogen generator and a catalyst provided in any one of a number of locations, including, by way of non-limiting example:

| HYDROGEN GENERATOR LOCATIONS | CATALYST LOCATIONS |
|---|---|
| Container neck | Container neck |
| Container base | Container base |
| Label | Label |
| Label adhesive | Label adhesive |
| Printing | Printing |
| Accessories | Accessories |
|  | Closure insert |
|  | Closure shell |

As can be appreciated from the table above, because the hydrogen generator and catalyst do not react directly with each other, both can be placed in the same location. Although in some embodiments, the system is more efficient when hydrogen is generated close to the catalytic sites that covert hydrogen and oxygen into water. Finally, since the complete system (hydrogen generator and catalyst) are both located in the same product, it is anticipated that distinct systems and/or assemblies can be used, comprising collectively or separately the hydrogen generator and the catalyst, that attach to existing containers without specific modification. In this way, the present teachings provide a method to retrofit existing container designs and supplies to achieve the benefits of the present teachings. By way of non-limiting example, a label system including a label 60, perhaps including indicia 62 printed on the label 60, can contain the complete system, which could be placed on any container to give it oxygen scavenging capabilities.

With regard to the potential placement locations enumerated above in connection with the hydrogen generator and catalyst, the following provides additional detail related thereto. Specifically, this discussion relates to placement of the hydrogen generator and catalyst within the container.

In connection with the hydrogen generator, in some embodiments, the hydrogen generator can be dispersed in or coated on the inside or outside of the neck area or incorporated into the neck area using a multilayer structure. This location has at least three advantages not found in the prior art, specifically the neck area is not blow molded like the rest of the package. Therefore, the hydrogen generator is not exposed to high heat and mechanical stress, which may limit its use. Moreover, the hydrogen generator can be "activated" by the mechanical forces created when the closure is placed on the container. Moreover, if the hydrogen generator decreases the desired clarity of the container, it will not be noticeable to the consumer under the closure.

In some embodiments, the hydrogen generator can be dispersed in or coated on the inside or outside of the base area or incorporated into the base region using multilayer technology. In addition, a solid insert containing the hydrogen generator can be placed on or inserted into the base area. This location has at least two advantages over the prior art, specifically, if the hydrogen generator decreases the desired clarity of the container, it will not be noticeable to the consumer under the closure. Moreover, large hydrogen generator inserts can be placed in the base without detracting from the overall look of the container.

Figure 2:
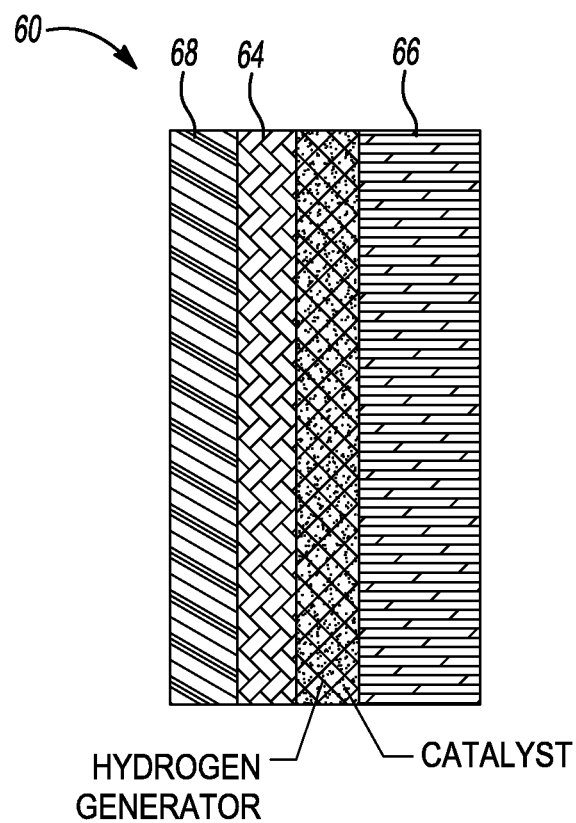
FIG. 2 is a cross-sectional view of a label coupled to the container of FIG. 1.

In some embodiments, the hydrogen generator can be dispersed in or coated on the inside or outside of the container label 60 that is affixed to the container 10, as illustrated with the cross-hatching of FIGS. 1-2, for example. In some embodiments, it may be advantageous to have a hydrogen-reflective layer 64 on the outside of the label to direct hydrogen generated towards the container wall.

In some embodiments, the hydrogen generator can be dispersed in the adhesive 66 used to attach the label 60 to the container 10, as illustrated in FIG. 2, for example. Similar to the label described herein, in some embodiments, it may be advantageous to have a hydrogen-reflective layer 64 on the label or formed as part of the adhesive to direct hydrogen generated in the adhesive towards the container wall.

In some embodiments, the hydrogen generator can be dispersed in or coated on an accessory attached to the outside of the container. By way of non-limiting example, the accessory can be a badge, holder, band, handle or any other object that can be placed in contact with the container.

Figure 3:
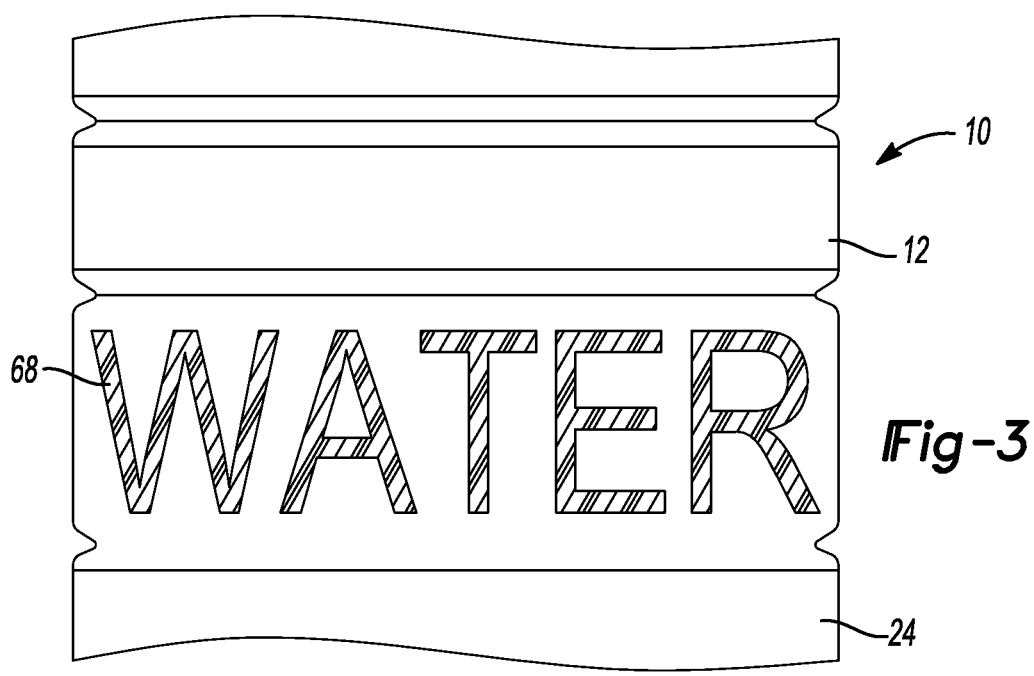
FIG. 3 illustrates an ink printing on the container of FIG. 1.

Finally, in some embodiments, the hydrogen generator can be dispersed in an ink 68 that is printed or otherwise transferred onto the external surface of the container or container label substrate, as illustrated in FIGS. 1-3, for example.

It should be appreciated that the benefits and use of the hydrogen generator can be achieved through a less-invasive incorporation technique, such as those set forth herein.

In connection with the catalyst, in some embodiments, the catalyst can be dispersed in or coated on the inside or outside of the neck area or incorporated into the neck area using a multilayer structure. This location has at least two advantages not found in the prior art, specifically the neck area is not blow molded like the rest of the package. Therefore, the catalyst is not exposed to high heat and mechanical stress, which may limit its use. Moreover, if the catalyst decreases the desired clarity of the container, it will not be noticeable to the consumer under the closure.

In some embodiments, the catalyst can be dispersed in or coated on the inside or outside of the base area or incorporated into the base region using multilayer technology. Preferably, the multilayer configuration will be confined within the base region and limited to the area inward of the container standing surface. In addition, a solid insert containing the catalyst can be placed on or inserted into the base area. This location has at least two advantages over the prior art, specifically, if the catalyst decreases the desired clarity of the container, it will not be noticeable to the consumer on the underside of the container. Moreover, large catalyst inserts can be placed in the base without detracting from the overall look of the container.

In some embodiments, the catalyst can be dispersed in or coated on the inside or outside of the container label 60 that is affixed to the container 10, as illustrated in FIGS. 1 and 2, for example. In some embodiments, the catalyst can be dispersed in the adhesive 66 used to attach the label 60 to the container 10, as illustrated in FIG. 2, for example.

In some embodiments, the catalyst can be dispersed in or coated on an accessory attached to the outside of the container. By way of non-limiting example, the accessory can be a badge, holder, band, handle or any other object that can be placed in contact with the container.

In some embodiments, the catalyst can be dispersed in an ink 68 that is printed or otherwise transferred onto the external surface of the container or container label substrate, as illustrated in FIGS. 1-3, for example.

Finally, in some embodiments, the catalyst can be coated onto the surface of the closure shell itself and/or a closure shell insert. When coated onto the surface of the closure shell or insert, the catalyst can be placed on the outside or food side of the insert.

In some embodiments, the hydrogen generator and the catalyst can be co-located in the container. That is, because the hydrogen generator and catalyst do not react directly with each other, both can be placed in the same package location. To this end, in some embodiments, the hydrogen generator and the catalyst can be dispersed in or coated on the inside or outside of the neck area or incorporated into the neck area in a multilayer construction. Preferably, this multilayer construction including the hydrogen generator and/or catalyst will be confined only to the finish area while the container body portion will be of a monolayer construction. This arrangement has at least two advantages over the prior art. Specifically, the neck area is not blow molded like the rest of the package. Therefore, the hydrogen generator and the catalyst are not exposed to high heat and mechanical stress, which may limit their use. Moreover, if the hydrogen generator and/or catalyst decreases the desired clarity of the container, it will not be noticeable to the consumer under the closure.

In some embodiments, the hydrogen generator and catalyst can be dispersed in or coated on the inside or outside of the base area. In addition, a solid insert containing the hydrogen generator and catalyst can be placed on or inserted into the base area or incorporated into the base region utilizing coinjection processing to create a multilayer structure within that region. Preferably, the multilayer configuration will be confined within the base region and limited to the area inward of the container standing surface. This arrangement has at least two advantages over the prior art. Specifically, if the hydrogen generator and/or catalyst decreases the desired clarity of the container, it will not be noticeable to the consumer under the closure. Moreover, large hydrogen generators and catalyst inserts can be placed in the base without detracting from the overall look of the container.

In some embodiments, the hydrogen generator and catalyst can be dispersed in or coated on the inside or outside of the container label 60, as illustrated in FIGS. 1 and 2, for example. Still further, in some embodiments, the hydrogen generator and catalyst can be dispersed in the adhesive 66 used to attach the label to the container, as illustrated in FIG. 2, for example.

In some embodiments, the hydrogen generator and the catalyst can be dispersed in or coated on an accessory attached to the outside of the container. By way of non-limiting example, the accessory can be a badge, holder, band, handle or any other object that can be placed in contact with the container.

In some embodiments, the hydrogen generator and the catalyst can be dispersed in an ink 68 that is printed or otherwise transferred onto the external surface of the container or container label substrate, as illustrated in FIGS. 1-3, for example.

In some embodiments, it may be desirable to improve the package clarity of containers containing dispersed hydrogen generators and catalysts. To this end, at least two methods are disclosed for dispersing the hydrogen generator and catalyst in the container wall (or clear plastics in general) without affecting clarity.

A first method can comprise dissolving the hydrogen generator in a solvent that is coextruded or blended with the PET (or a polymer in general). By way of non-limiting example, solvents that can be used in conjunction with the hydrogen generator sodium borohydride comprise 1) Diethylene glycol dimethyl ether, 2) Triethylene glycol dimethyl ether, and 3) Tetraethylene glycol dimethyl ether.

A second method can comprise using compatibilizers (bi-functional molecules) to increase the dispersion and reduce the particle size of the hydrogen generator and/or the catalyst in the PET (or polymer in general). Specifically, compatibilizers can be used to disperse inorganic materials like nanoclays and dyes in PET. These same compatibilizers can be used to disperse the hydrogen generator and catalyst in the PET. By way of non-limiting example, the compatibilizers can comprise 12-aminododecanoic acid.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for forming a preform for use in forming a container having a hydrogen generator and a catalyst, the method comprising:
   dissolving the hydrogen generator in a solvent to form a dissolved product, wherein the solvent includes an ether;
   extruding a polymer material with the dissolved product to form the preform; and
   subsequently blow molding the preform into a container.

2. The method according to claim 1 further including the step of incorporating the catalyst within a base portion of the container using multilayer technology.

3. The method according to claim 2 further including the step of confining a multilayer configuration including the catalyst within the base portion and specifically inward of the container standing surface.

4. The method according to claim 1 further including the step of incorporating both the hydrogen generator and the catalyst within a neck area using a multilayer construction.

5. The method according to claim 4 further including the step of confining the multilayer construction including the hydrogen generator and the catalyst within the neck area.

6. The method according to claim 4 further including the step of prohibiting the hydrogen generator and the catalyst from exposure to high heat and mechanical stress.

7. The method according to claim 1 further including the step of incorporating both the hydrogen generator and the catalyst within a base portion utilizing a coinjection processing to create a multilayer structure.

8. The method according to claim 7 further including the step of confining a multilayer configuration including the hydrogen generator and the catalyst within the base portion and specifically inward of the container standing surface.

9. A method for forming a preform for use in forming a container having a hydrogen generator and a catalyst, the method comprising:
   combining a compatibilizer with the hydrogen generator and the catalyst to form a combined product, wherein the compatibilizer is a 12-aminododecanoic acid; and
   extruding a polymer material with the combined product to form the preform; and
   subsequently blow molding the preform into a container.

10. The method according to claim 9 further including the step of incorporating the catalyst within a base portion of the container using multilayer technology.

11. The method according to claim 10 further including the step of confining a multilayer configuration including the catalyst within the base portion and specifically inward of the container standing surface.

12. The method according to claim 9 further including the step of incorporating both the hydrogen generator and the catalyst within a neck area using a multilayer construction.

13. The method according to claim 12 further including the step of confining the multilayer construction including the hydrogen generator and the catalyst within the neck area.

14. The method according to claim 12 further including the step of prohibiting the hydrogen generator and the catalyst from exposure to high heat and mechanical stress.

15. The method according to claim 9 further including the step of incorporating both the hydrogen generator and the catalyst within a base portion utilizing a coinjection processing to create a multilayer structure.

16. The method according to claim 15 further including the step of confining a multilayer configuration including the hydrogen generator and the catalyst within the base portion and specifically inward of the container standing surface.

\* \* \* \* \*